United States Patent [19]

Iida

[11] 4,234,196
[45] Nov. 18, 1980

[54] ROLL NECK SEALING DEVICE

[75] Inventor: Yoshimi Iida, Kawasaki, Japan

[73] Assignee: Nippon Oil Seal Industry Co., Ltd., Tokyo, Japan

[21] Appl. No.: 59,161

[22] Filed: Jul. 20, 1979

[30] Foreign Application Priority Data

Feb. 21, 1979 [JP] Japan .................. 54-21275[U]

[51] Int. Cl.³ .................. F16J 15/32; F16J 15/38
[52] U.S. Cl. .................. 277/12; 277/85; 277/92; 277/95; 277/116.2; 277/142; 277/147; 277/152; 277/165; 277/166; 277/186; 277/188 R
[58] Field of Search .................. 277/DIG. 4, 1, 9, 12, 277/85, 92, 93 R, 93 SD, 95, 112, 116.2, 142, 143, 147, 152, 165, 166, 186, 188 R, 189; 72/237

[56] References Cited

U.S. PATENT DOCUMENTS

| | | | |
|---|---|---|---|
| 2,328,676 | 9/1943 | Rich | 277/95 X |
| 2,590,759 | 3/1952 | Dale et al. | 277/92 |
| 2,868,574 | 1/1959 | Rich | 277/152 X |
| 3,003,836 | 10/1961 | Hill | 72/237 X |
| 3,115,672 | 12/1963 | Seanor | 72/237 X |
| 3,545,774 | 12/1970 | Rickley | 277/95 X |
| 3,905,607 | 9/1975 | Maguire et al. | 277/92 |
| 4,022,480 | 5/1977 | Salter | 277/95 |
| 4,071,255 | 1/1978 | Salter | 277/95 X |
| 4,141,563 | 2/1979 | Wu | 277/165 X |
| 4,165,881 | 8/1979 | Salter | 277/152 |

FOREIGN PATENT DOCUMENTS

995934 6/1965 United Kingdom .................. 277/95

Primary Examiner—Robert S. Ward, Jr.
Attorney, Agent, or Firm—Holman & Stern

[57] ABSTRACT

A roll neck sealing device comprising a neck seal consisting of an inside neck seal and an outside neck seal, both fitted to the outer surface of the neck portion of a roll, and a preventive means, one end of which is secured to the outside neck seal and the other end of which is inserted through a tapered hole, formed in the inside neck seal, into a core hole formed in the fixing pin secured to the end of the sleeve, said preventive means being adapted for preventing relative rotation between the neck seal and the sleeve, whereby the axial length over which the preventive means is inserted into the fixing pin is set greater than the maximum allowable axial play between the sleeve and the bushing, said axial play being caused when the sealing member is being replaced.

3 Claims, 7 Drawing Figures

ROLL NECK SEALING DEVICE

BACKGROUND OF THE INVENTION

1. Field of the Invention

This invention relates generally to a sealing device for machines such as a rolling mill, and more particularly to an improvement in a neck sealing device for a roll, which consists in interconnecting an inside neck seal, an outside neck seal and a sleeve and providing a preventive means for preventing relative rotation between the neck seals and the sleeve so as to overcome problems encountered when a conventional sealing device is replaced.

2. Description of the Prior Art

The parts of conventional sealing devices of this type in general use exhibit looseness after extended useage and the axial movement of the sealing device increases, resulting in breakage of a lip portion and leakage of lubricating oil. In addition to the above problem, the conventional sealing device has a disadvantage in that the roll has to be suspended by the crane for replacement of the seals.

Figure 2:
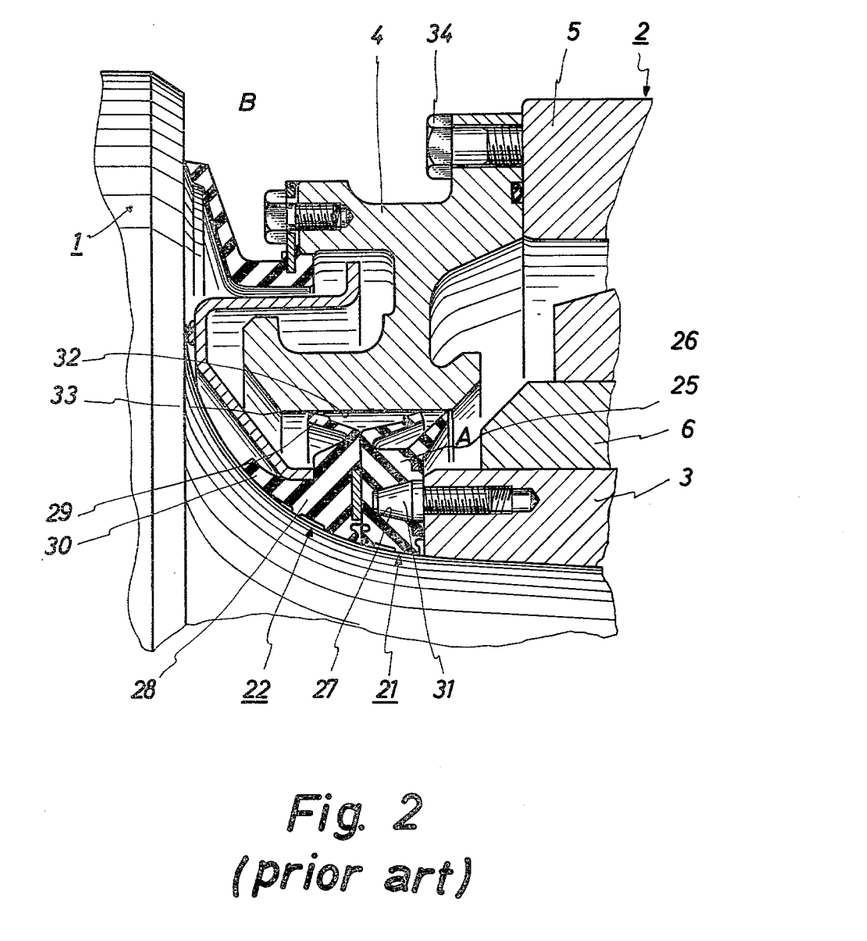
FIG. 2 is a cross-sectional view of a conventional neck sealing device mounted on a neck portion of the roll.

FIG. 2 shows a sealing device which has been improved to overcome the above-mentioned drawbacks. This device, too, has a disadvantage in that it requires time to be replaced, which is undesirable in view of the safety problems incurred in the replacement work.

Figure 1:
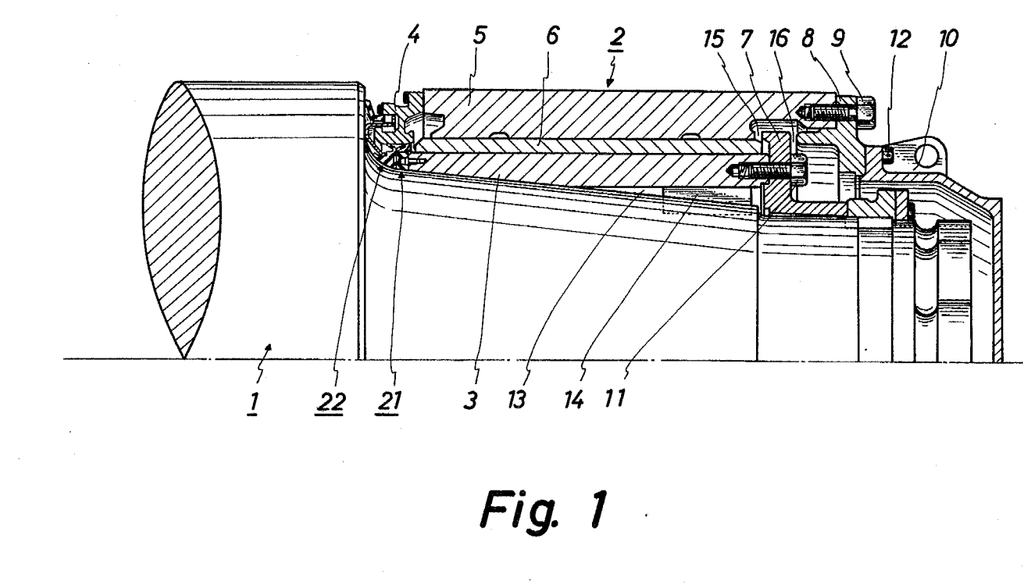
FIG. 1 is a cross-sectional view of a tapered portion of a roll.

These conventional devices will now be described in detail with reference to the drawings. FIG. 1 is a cross-sectional view of a roll neck portion of a typical rolling mill.

In FIG. 1, reference numeral 1 represents a roll, whose tapered portion has a sleeve 3 secured thereto through a key 14. A bushing 6 is secured by a housing 5 in such a manner that the inner surface of the bushing 6 slides on the outer surface of the sleeve 3. A stopper 7 is secured to one end of the sleeve 3 by bolt 11. Secured by bolt 9 to one end of the housing 5 is a holder 8 which has on its outer surface a cover 10 secured thereto by a bolt 12. A gap 15 is provided between bushing 6 and stopper 7, and another gap 16 between the stopper and holder 8, for design reasons. The above is the basic arrangement of the main parts of the roll neck portion. The neck seals 21 and 22, described below, are fitted to the neck portion of roll 1 between sleeve 3 and roll 1.

FIG. 2 is an enlarged view of the neck portion showing the conventional sealing device assembled in a correct position. As shown in FIG. 2, a fixing pin 31 is secured to the other end of sleeve 3. The tapered portion of fixing pin 31 is inserted in a tapered hole 27 formed in the inside neck seal 21 to prevent relative movement between sleeve 3 and the neck seals 21 and 22. The inside neck seal 21 and the outside neck seal 22 are rigidly interconnected to prevent relative movement therebetween. A seal end plate 4 is mounted on housing 5 by means of bolt 34. A sealing lip 26 of the inside neck seal 21 and sealing lip 29 of the outside neck seal 22 are located near the central area of the cylindrical inner surface 32 of the seal and plate 4. As demonstrated in FIG. 1, since sleeve 3 and bushing 6 are in sliding engagement with each other, when assembly 2, which is mounted on the sleeve 3 of the tapered portion of roll 1, is moved outwardly in the axial direction to replace the neck seals, the components rigidly connected to bushing 6 move rearwardly relative to sleeve 3 over the length of the gap 15.

Figure 3:
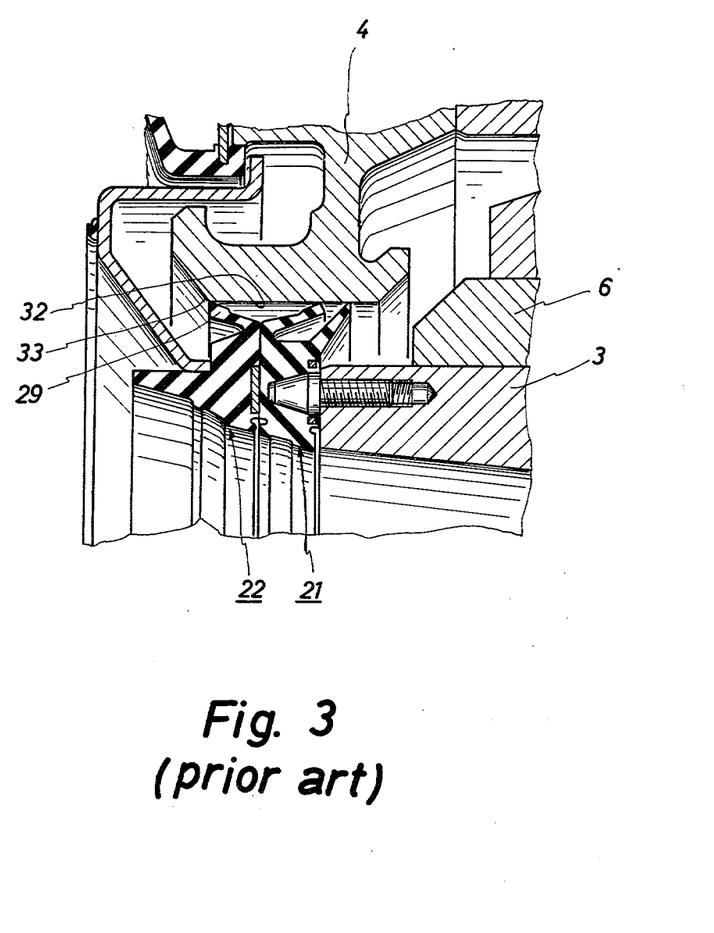
FIG. 3 is a cross-sectional view of a conventional neck sealing device removed from the tapered portion of the roll.

Since bushing 6 and seal end plate 4 are assembled as one piece, the relative position between the neck seals 21 and 22 and the seal end plate 4 is such that the sealing lip 29 of the outside seal 22 shifts to one end 33 of the cylindrical inner surface 32 of the seal end plate 4, as shown in FIG. 3.

Since sleeve 3 and bushing 6 are heavy, they cannot easily be moved to the position shown in FIG. 2, to replace neck seals 21 and 22, therefore, the neck seals of the roll are replaced by positioning as shown in FIG. 3.

Figure 4:
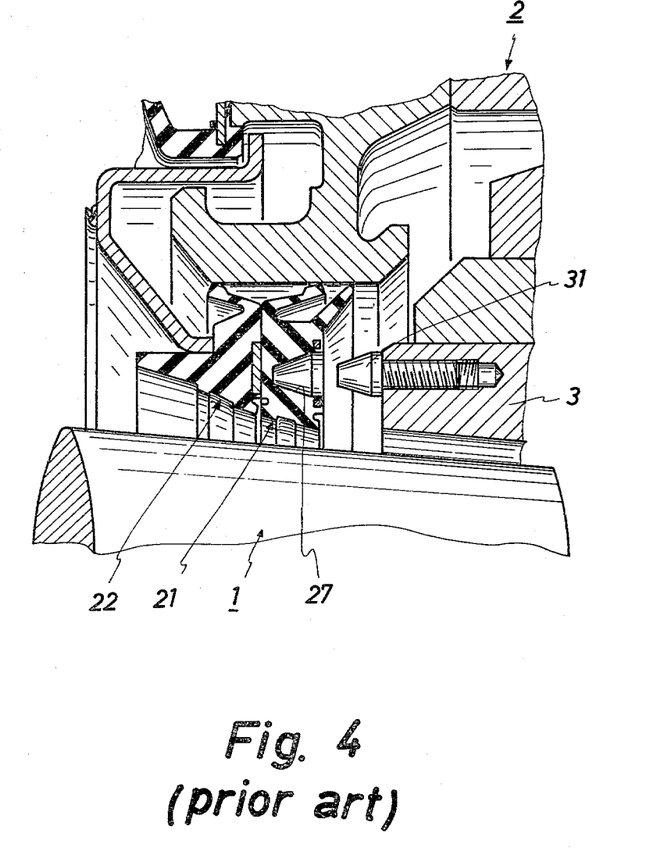
FIG. 4 is a cross-sectional view of a conventional neck sealing device as it is positioned on the tapered portion of a roll.

After the neck seals 21 and 22 have been fitted, assembly 2, mounted on the sleeve 3, is assembled onto the tapered portion of roll 1. If key 14 and keyway 13, shown in FIG. 1, are out of alignment, sleeve 3 abuts the key and the components rigidly mounted on bushing 6 slide forward on sleeve 3 through the length of gaps 15 and 16 (illustrated in FIG. 1). As a result, neck seals 21 and 22 and fixing pin 31 assume their position as shown in FIG. 4. If, in this position, sleeve 3 is rotated to bring key 14 into alignment with keyway 13, relative rotation takes place between sleeve 3 and assembly 2 including neck seals 21 and 22, with the result that fixing pin 31 and tapered hole 27 become misaligned. It is, however, very difficult to bring into correct engagement simultaneously key 14 and keyway 13, and fixing pin 31 and tapered hole 27, because of the mass of sleeve 3 and bushing 6. Further, since the roller must be suspended by a crane for replacement of the seals, the assembling work must be carried out in a very unstable condition.

SUMMARY OF THE INVENTION

It is an object of the present invention to provide a neck sealing device for a roll, which enables easy removal and replacement of seals.

Another object of this invention is to provide a neck sealing device for a roll which enables seals to be accurately fitted in place.

DETAILED DESCRIPTION OF THE PREFERRED EMBODIMENTS

Figure 5:
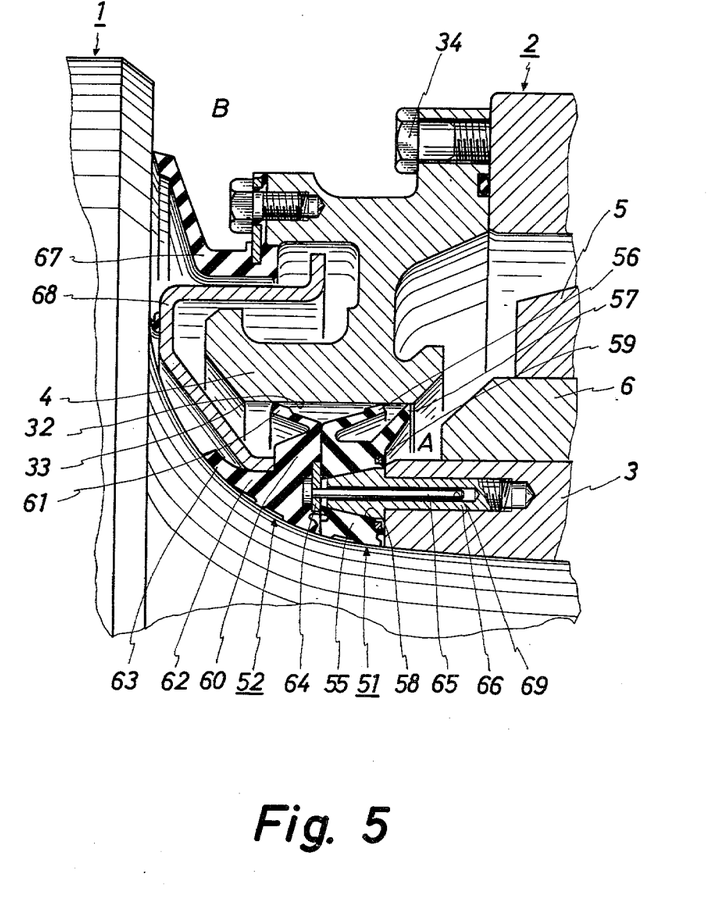
FIG. 5 is a cross-sectional view of a neck sealing device, according to this invention, fitted to the neck portion of a roll.

One embodiment of the present invention will now be described with reference to FIGS. 5 and 1. FIG. 5 shows the neck sealing device of this invention set in a correct position. Roll 1 has a keyway 13 in its outer surface for receiving a key 14 secured to the inner surface of sleeve 3, as shown in FIG. 1, so that relative rotation between sleeve 3 and roll 1 is prevented. Bushing 6 is mounted on sleeve 3 in such a manner that the outer surface of sleeve 3 can rotate relative to the inner surface of bushing 6. The outer surface of bushing 6 is secured to inner surface of the housing 5. To enable neck seals 51 and 52 to be adjusted to the correct positions, gap 15 is provided between one end of bushing 6 and stopper 7 (shown in FIG. 7), and another gap 16 is provided between stopper 7 and holder 8. Between water seal 67 and housing 5, seal end plate 4, of roughly T-shaped configuration, is secured to housing 5 with bolt 34. Inside neck seal 51, made of resilient material, located on the side of sleeve 3, has a first body portion 55 of an almost rectangular cross section with two sealing lips 56 and 57 at the ends of its outer surface. The first body portion 55 has a tapered hole 58 flaring toward sleeve 3 for receiving fixing pin 66. Tapered hole 58 is provided with reinforcing annular plate 59 at the enlarged bore portion of the opening side. The tapered portion of fixing pin 66, secured to the side of sleeve 3, is inserted into tapered hole 58 to restrict the relative circumferential movement of inside neck seal 51 with respect to sleeve 3.

Figure 7:
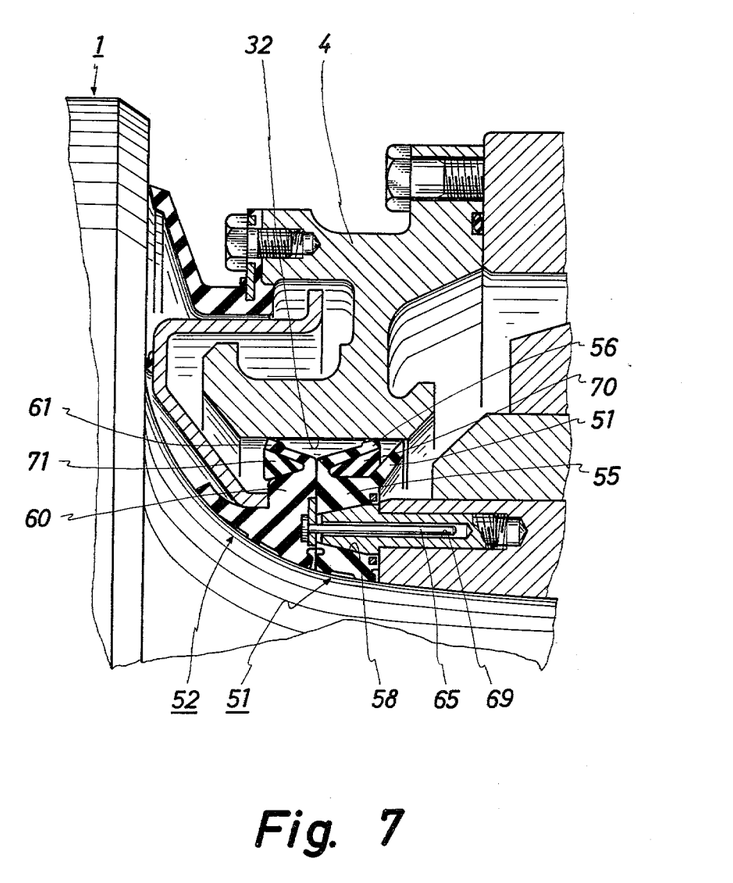
FIG. 7 is a cross-sectional view of another embodiment of the present invention fitted to the neck portion of the roll.

Outside neck seal 52, made of resilient material, is set side by side with inside neck seal 51 near the side of roll 1 and has a second body portion 60 of a substantially rectangular cross section. Second body portion 60 has sealing lip 61 formed on its outer surface, projected portion 62 extending axially toward roll 1 for supporting the end of the cylindrical inner surface of seal inner ring 68, and outside lip 63 extending axially from the projected portion 62. Outside neck seal 52 has sandwich plate 64 embedded in its side contacting the inside neck seal. A bar-like preventive means 65 is embedded at one end in the second body portion 60 of outside neck seal 52, and at the other end extends through sandwich plate 64 into a core hole 69 formed in the fixing pin 66. The length by which preventive means 65 is inserted into core hole 69 is sufficiently longer than the sum of the gaps 15 and 16 shown in FIG. 1, so that the relative rotation between neck seals 51 and 52 and sleeve 3 can be prevented when the neck sealing device is installed. Normally, there is also provided a means for preventing relative rotation between the inside neck seal 51 and the outside neck seal 52. One method of preventing the relative movement between the seals is by forming a raised portion on the side of one seal and a recessed portion on the opposing side of the other seal and by inserting the raised portion into the recessed portion. This is not shown in the drawing. As shown in FIG. 7, annular members 70 and 71 which are made of a sponge rubber material and have an almost triangular cross section are interposed between sealing lip 56 of the inside neck seal 51 and the outer surface of the first body portion 55 and between the sealing lip 61 of the outside neck seal 52 and the second body portion 60. These annular members 70 and 71, are for giving sealing lips 56 and 61 radial elasticity and may be replaced by elastic rubber members, or hollow rings or leaf springs made of elastic material.

Figure 6:
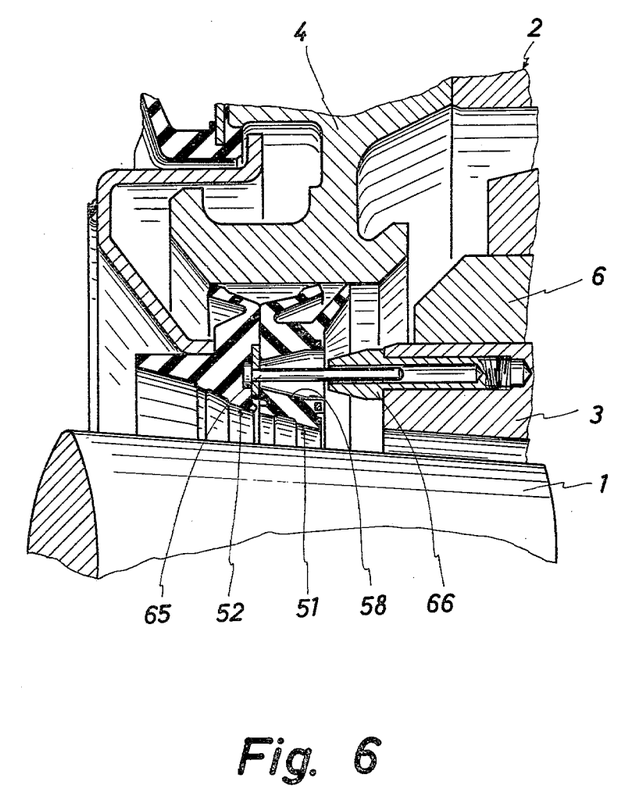
FIG. 6 is a cross-sectional view of a neck sealing device of the present invention as it is positioned on the tapered portion of roll.

Because of the above-mentioned construction, the neck sealing device according to this invention has the following effects and advantages. These advantages are explained referring to FIGS. 1 and 6. The neck sealing device shown in FIG. 6 is of the same construction as the one shown in FIG. 5, but FIG. 6 illustrates the device when assembly 2 is being inserted on the tapered portion of roll 1. If the keyway 13 are out of alignment with each other, when assembly 2 (mounted on the sleeve 3) is inserted on the tapered portion of roll 1, key 14, secured to the sleeve 3, abuts against roll 1 and further advancement of sleeve 3 is obstructed so that only the component rigidly assembled on bushing 6 is moved forward through the distance of gaps 15 and 16, shown in FIG. 1. As a result, neck seals 51 and 52 separate from sleeve 3 by a large distance and fixing pin 66 disengages from tapered hole 58 of inside neck seal 51. At this time, however, since preventive means 65 projecting from outside neck seal 52 remains inserted in fixing pin 66, the relative rotation between neck seals 51 and 52 and sleeve 3 is prevented. Accordingly, when sleeve 3 is turned to bring into alignment key 14 and keyway 13, shown in FIG. 1, neck seals 51 and 52 will also turn together with sleeve 3, therefore, no slippage will occur between neck seals 51 and 52 and sleeve 3 in circumferential direction. Thus, the fixing pin 66 can easily be inserted into tapered hole 58, as shown in FIG. 5.

The preventive means 65 not only makes the assembling of the neck seals 51 and 52 easy but also can be expressed to keep the neck seals in place and prevent them from floating by the centrifugal force from the sealing portion. Further, by arranging annular members 70 and 71 in a manner shown in FIG. 7, it is possible to prevent a decrease in the contact pressure of sealing lips 56 and 61 bearing upon cylindrical inner surface 32 of seal end plate 4.

The neck sealing device of this invention, having the construction described above, enables very easy replacement of the neck seal on the roll, so that such replacement can be safely carried out. Further, with the preventive means extending from the neck seals into the sleeve, it is possible to prevent a part of the neck seal from floating by the centrifugal force from the sealing portion and also prevent instability in the sliding contact pressure of the lips. Therefore, this neck sealing device provides effective and complete sealing of oil (A) and coolant (B) by the neck seals.

What is claimed is:

1. A roll neck sealing device comprising:
    a sleeve mounted on an outer surface of a roll at one end;
    a bushing mounted on said sleeve for relative rotation with respect to said sleeve;
    a housing secured to an outer surface of said bushing for supporting said roll;
    a neck seal consisting of an inside neck seal and an outside neck seal, both fitted to an outer surface of a neck portion of said roll;
    a seal end plate which is secured to said housing and provides a cylindrical inner surface against which sealing lips of said neck seal bear and slide;
    an engagement means consisting of a fixing pin projecting from an end of said sleeve toward said inside neck seal and a hole formed in said inside neck seal; and
    a preventive means, one end of which is secured to said outside neck seal and the other end of which extends through said hole into a core hole formed in said fixing pin which is received in said sleeve, said preventive means being adapted for preventing relative rotation between said neck seal and said sleeve;

whereby an axial length over which said preventive means is inserted into said fixing pin is set at a distance greater than the maximum allowable axial play between said sleeve and said bushing that is caused when the sealing member is being replaced.

2. A roll neck sealing device as set forth in claim 1, wherein elastic annular members are interposed between said sealing lip of said inside neck seal and an outer surface of a first body portion thereof and between said sealing lip of said outside neck seal and an outer surface of a second body portion thereof.

3. A roll neck sealing device as set forth in claim 1, wherein a reinforcing plate is embedded in said inside neck seal around an opening portion of said hole.

* * * * *